US009285452B2

(12) United States Patent
Tammi et al.

(10) Patent No.: US 9,285,452 B2
(45) Date of Patent: Mar. 15, 2016

(54) SPATIAL VISUAL EFFECT CREATION AND DISPLAY SUCH AS FOR A SCREENSAVER

(75) Inventors: Mikko T. Tammi, Tampere (FI); Miikka T. Vilermo, Nokia (FI)

(73) Assignee: Nokia Technologies Oy, Espoo (FI)

(*) Notice: Subject to any disclaimer, the term of this patent is extended or adjusted under 35 U.S.C. 154(b) by 725 days.

(21) Appl. No.: 13/298,453

(22) Filed: Nov. 17, 2011

(65) Prior Publication Data

US 2013/0132845 A1  May 23, 2013

(51) Int. Cl.
*G01S 3/80* (2006.01)
*H04R 3/00* (2006.01)

(52) U.S. Cl.
CPC ............. *G01S 3/8006* (2013.01); *H04R 3/005* (2013.01)

(58) Field of Classification Search
CPC ....... G01S 3/8006; G01S 3/8083; H04S 7/40; H04R 3/005; H04R 1/406; H04R 2201/401; H04R 25/407; H04R 2201/40
USPC ............................... 381/92, 56; 715/867, 716
See application file for complete search history.

(56) References Cited

U.S. PATENT DOCUMENTS

| 2002/0196294 | A1 | 12/2002 | Sesek | 345/867 |
|---|---|---|---|---|
| 2006/0279418 | A1 | 12/2006 | Albert et al. | 340/521 |
| 2009/0088964 | A1 | 4/2009 | Schaaf et al. | |
| 2010/0185308 | A1 | 7/2010 | Yoshida et al. | 700/94 |
| 2011/0013075 | A1 | 1/2011 | Kim et al. | 348/370 |
| 2011/0054890 | A1 | 3/2011 | Ketola et al. | 704/231 |
| 2011/0109538 | A1 | 5/2011 | Kerr et al. | 345/156 |
| 2011/0275434 | A1 | 11/2011 | Cheng et al. | 463/36 |

FOREIGN PATENT DOCUMENTS

| EP | 1752880 A1 | 2/2007 |
|---|---|---|
| JP | 2005099418 A | 4/2005 |
| JP | 2009271183 A | 11/2009 |
| JP | 2011165056 A | 8/2011 |
| JP | 2011180470 A | 9/2011 |
| WO | WO-2010/112677 A1 | 10/2010 |
| WO | WO-2011/076286 A1 | 6/2011 |

OTHER PUBLICATIONS

Tellakula, "Acoustic source localization using time delay estimation", Aug. 2007, pp. 1-82.*

(Continued)

*Primary Examiner* — Vivian Chin
*Assistant Examiner* — David Ton
(74) *Attorney, Agent, or Firm* — Harrington & Smith

(57) ABSTRACT

Techniques are presented that include determining, using signals captured from two or more microphones configured to detect an acoustic signal from one or more sound sources, one or more prominent sound sources based on the one or more sound sources. The techniques also include determining one or more directions relative to a position of one or more of the two or more microphones for prominent sound source(s). The techniques further include outputting information suitable to be viewed on a display, the information providing for the prominent sound source(s) a visual effect indicating at least in part the one or more directions, relative to a position of one or more of the microphones, of the prominent sound source(s) in the acoustic signal. The information and the corresponding visual effect(s) may be presented on a display, e.g., as part of a screensaver.

18 Claims, 8 Drawing Sheets

(56) References Cited

OTHER PUBLICATIONS

Hassanpour et al, "Adaptive DOA tracking using microphone array"; Dec. 19, 2006; pp. 1-4.*

"Soundstream," screensaver download page [online] Oct. 15, 2011; <URL:http://web.archive.org/web/2011101504603/http://pcheese.net/software/soundstream/>.

"Limitations and Capabilities of Directons-of-Arrival Estimation Techniques using an Array of Antennas: A Mobile Communications Perspective", Lal C. Godara, IEEE 1996, pp. 327-333.

"A Generalized Steered Response Power Method for Computationally Viable Source Localizaton", Jacek P. Dmochowski, et al., IEEE 2007, pp. 2510-2526.

"iPod to create its own screen saver based on the surrounding", The Mobile Indian, Aug. 2, 2011, 2 pgs.

"The Psychedelic Screen Saver", http://www.synthesof.com/psych/psych.htm; Aug. 2, 2011, 2 pgs.

* cited by examiner

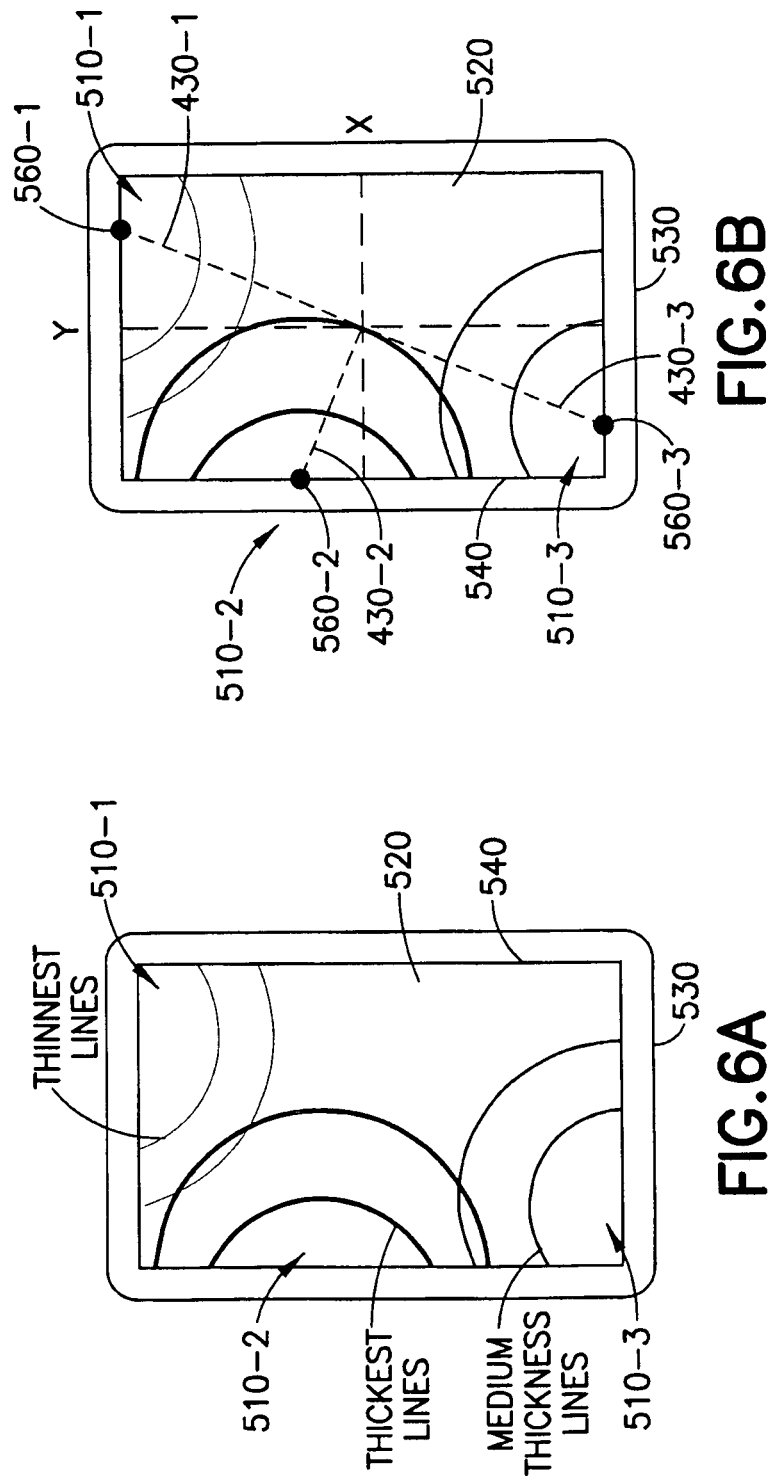

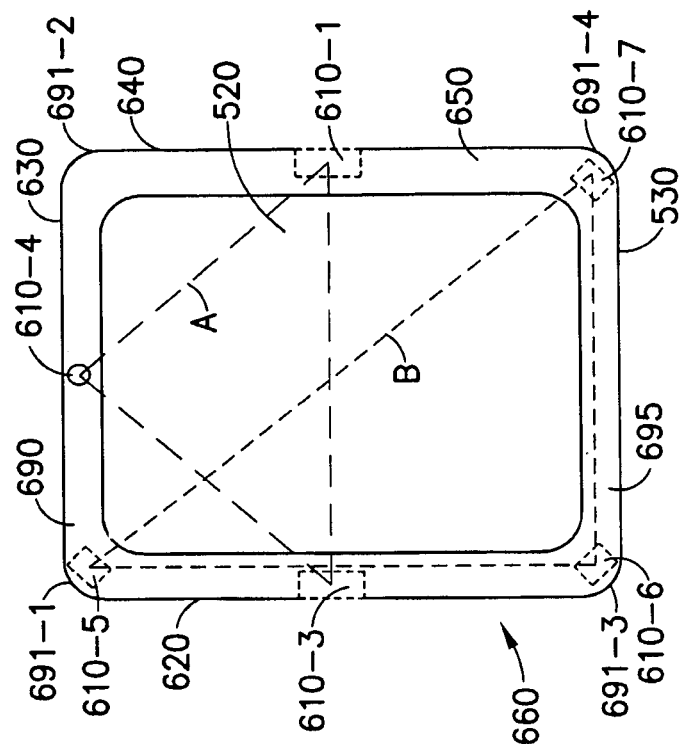
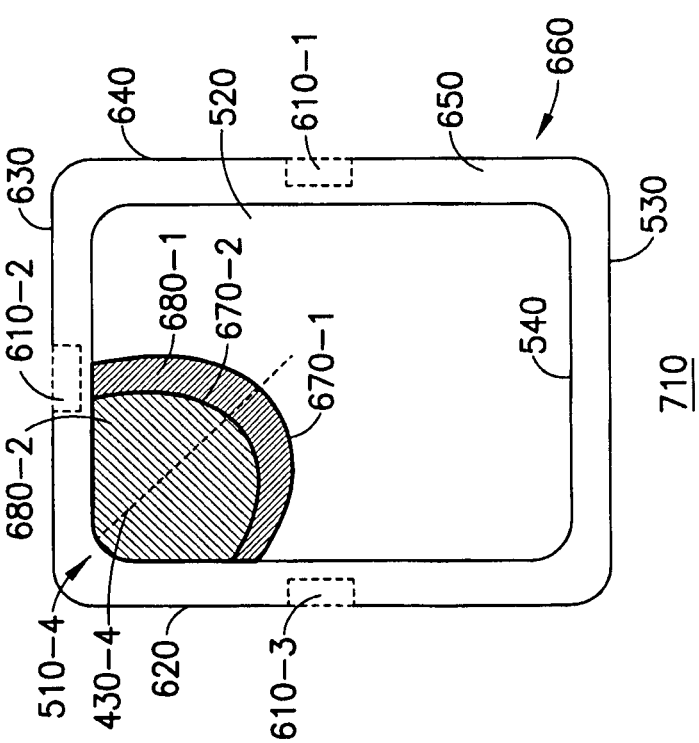

SPATIAL VISUAL EFFECT CREATION AND DISPLAY SUCH AS FOR A SCREENSAVER

TECHNICAL FIELD

This invention relates generally to computer systems able to be coupled to or having displays and, more specifically, relates to creating information suitable to be viewed on the display.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Using multiple microphones and certain processing techniques, it is possible to capture and analyze sound sources around a mobile device and their spatial relationships relative to the mobile device. This is useful when recording audio alone or together with video, in mixed reality solutions, and also in teleconferencing applications. However, there are also other potential applications of this technology.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 6, including FIGS. 6A and 6B, are illustrations of visual effects on a display of a mobile device for the three sound source illustration of FIG. 5.

FIGS. 7 and 8 illustrate a wireless device and exemplary locations for microphones in the wireless device.

SUMMARY

Figure 1:
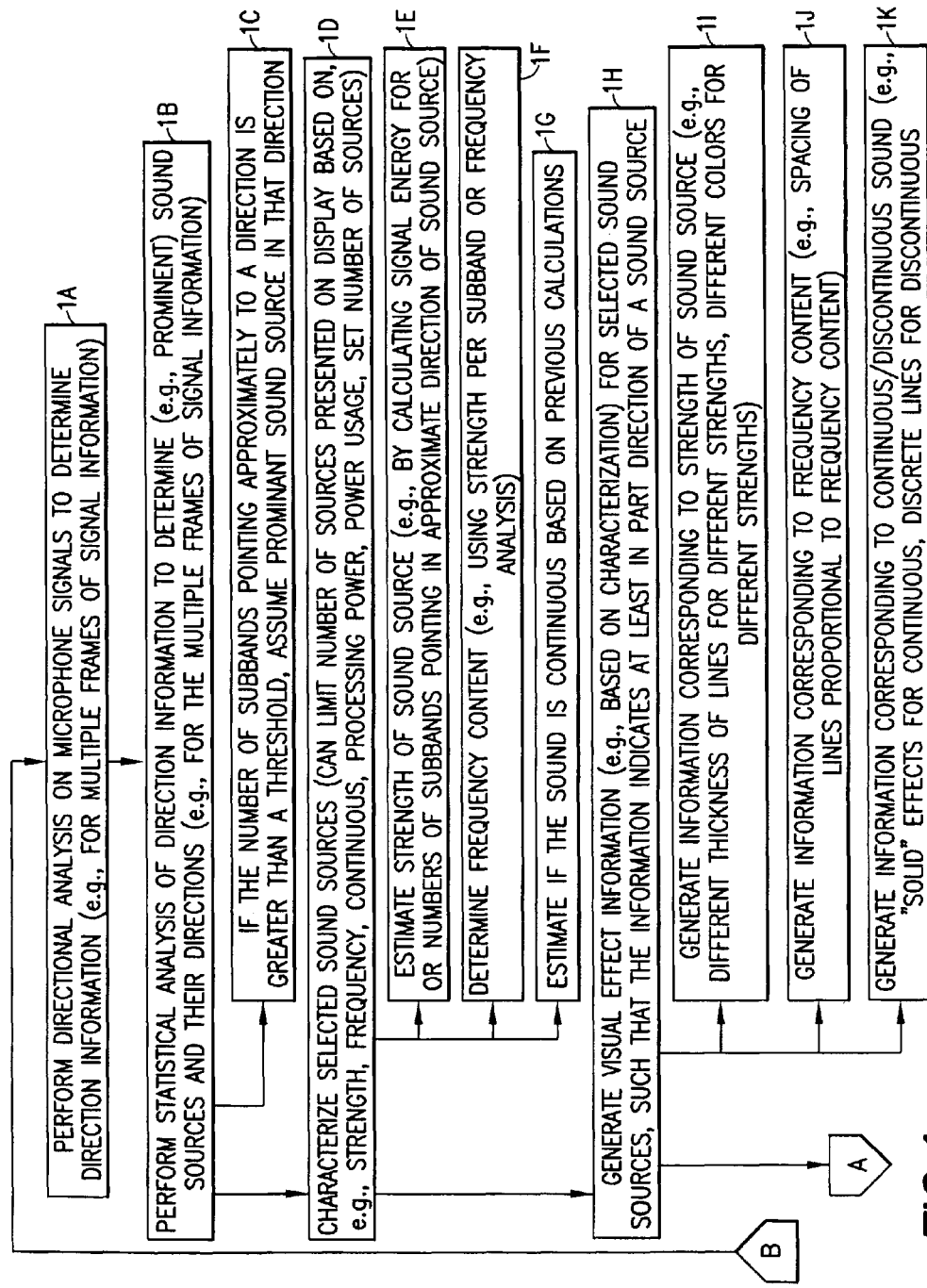
FIG. 1 is a block diagram of an exemplary method for spatial visual effect and display, such as for a screensaver.
Figure 1:
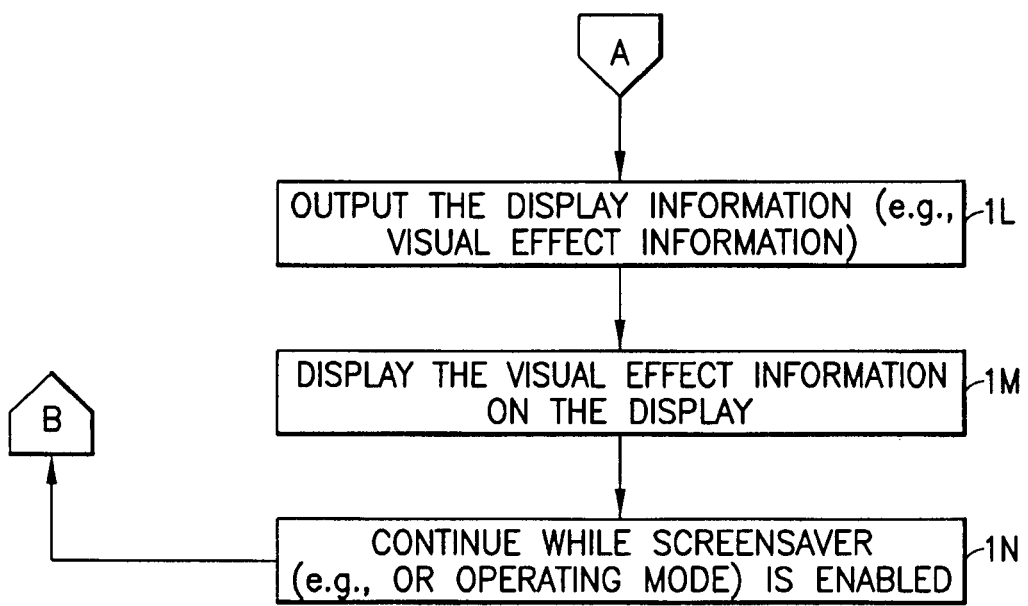

In an exemplary embodiment, an apparatus is disclosed that includes one or more processors, and one or more memories including computer program code. The one or more memories and the computer program code are configured to, with the one or more processors, cause the apparatus to perform at least the following: determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and outputting information suitable to be viewed on a display, the information providing for the at least one prominent sound source a visual effect indicating at least in part the one or more directions, relative to a position of at least one microphone, of the at least one prominent sound source in the acoustic signal.

In a further exemplary embodiment, a method is disclosed that includes determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and outputting information suitable to be viewed on a display, the information providing for the at least one prominent sound source a visual effect indicating at least in part the one or more directions, relative to a position of at least one microphone, of the at least one prominent sound source in the acoustic signal.

In an additional exemplary embodiment, a computer program product is disclosed that includes a computer-readable medium bearing computer program code embodied therein for use with a computer. The computer program code includes: code for determining, using signals captured from two or more microphones configured to detect an acoustic signal from one or more sound sources, one or more prominent sound sources based on the one or more sound sources; code for determining one or more directions relative to a position of at least one of the two or more microphones for at least one of the one or more prominent sound sources; and code for outputting information suitable to be viewed on a display, the information providing for the at least one prominent sound source a visual effect indicating at least in part the one or more directions, relative to a position of at least one microphone, of the at least one prominent sound source in the acoustic signal.

In yet another exemplary embodiment, an apparatus includes: means for determining, using signals captured from two or more microphones configured to detect an acoustic signal from one or more sound sources, one or more prominent sound sources based on the one or more sound sources; means for determining one or more directions relative to a position of at least one of the two or more microphones for at least one of the one or more prominent sound sources; and means for outputting information suitable to be viewed on a display, the information providing for the at least one prominent sound source a visual effect indicating at least in part the one or more directions, relative to a position of at least one microphone, of the at least one prominent sound source in the acoustic signal.

DETAILED DESCRIPTION OF THE DRAWINGS

Most current mobile devices are not able to capture a spatial sound field around the mobile device with required accuracy such that the directions of the main sound sources would be known. In U.S. patent application Ser. No. 12/927,663, such techniques where presented. The techniques there utilize three (for instance) microphones and dedicated processing to analyze the spatial sound field around the device. As multiple microphone systems are planned for new wireless devices, this type of spatial audio capture also enables new innovative solutions also for example to the user interface or other applications in the device. More specifically, the mobile device can present visualizations of the sound sources around the user. An exemplary embodiment of the invention develops an entertaining screen saver which presents visualizations of, e.g., the directions and strengths of the sound sources around the user.

Exemplary embodiments are initially presented in the context of the exemplary method shown in FIG. 1. This method may be performed by computer program code, executed by one or more processors that cause a computer system such as a mobile device to perform the operations in the method. Some or all of the method may also be performed by hardware, such as an integrated circuit designed to carry out the operations. The method may also be performed by some combination of computer program code (executed by one or more processors) or hardware.

In block 1A of FIG. 1, the computer system performs directional analysis on microphone signals to determine direction information (e.g., for multiple frames of signal information). There are techniques presented below that are able to perform directional analysis on a per-subband basis. However, the current invention is not limited to use of these techniques. Any techniques may be used that are able to determine direction of sound from multiple microphones. For instance, any of the techniques in the following documents may be used: J. P. Dmochowski, J. Benesty, S. Affes, "A Generalized Steered Response Power Method for Computationally Viable Source Localization" IEEE transactions on audio, speech, and language processing, vol. 15, no. 8, November 2007; and L. Godara, "Limitations and Capabilities of Directions-of-Arrival Estimation Techniques using an Array of Antennas: A Mobile Communications Perspective," Phased Array Systems and Technology, IEEE International Symposium (1996).

Figure 2:
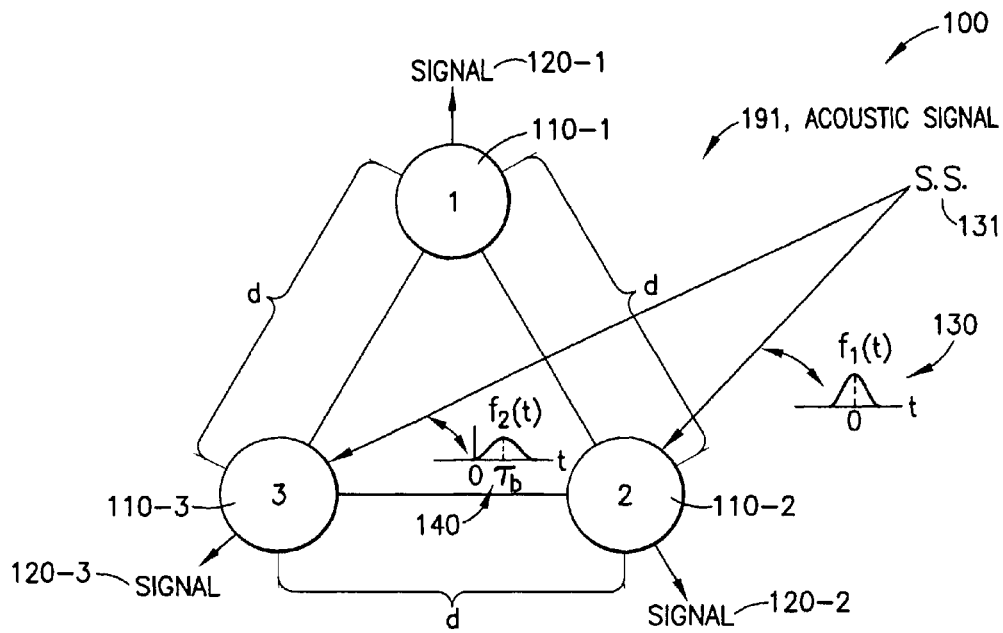
FIG. 2 shows an exemplary microphone setup using omni-directional microphones.

Turning now to FIG. 2 (in addition to FIG. 1) and to the techniques that are able to analyze sound directions on a per-subband basis, the following techniques mainly refer to a system 100 with three microphones 110-1, 110-2, and 110-3 on a plane (e.g., horizontal level) in the geometrical shape of a triangle with vertices separated by distance, d, as illustrated in FIG. 2. However, the techniques can be easily generalized to different microphone setups and geometry. Typically, all the microphones are able to capture sound events from all directions, i.e., the microphones are omnidirectional. Each microphone 110 produces a typically analog signal 120.

In the instant techniques, the directional component of sound from several microphones is enhanced by removing time differences in each frequency band of the microphone signals.

There are many alternative methods regarding how to estimate the direction of arriving sound. In the instant description, one method is described to determine the directional information. This method has been found to be efficient. This method is merely exemplary and other methods may be used. This method is described using FIGS. 3 and 4 (referring also to FIG. 2). It is noted that the flowcharts for FIGS. 3 and 4 (and all other figures having flowcharts) may be performed by software executed by one or more processors, hardware elements (such as integrated circuits) designed to incorporate and perform one or more of the operations in the flowcharts, or some combination of these.

A straightforward direction analysis method, which is directly based on correlation between channels, is now described. The direction of arriving sound is estimated independently for B frequency domain subbands. The idea is to find the direction of the perceptually dominating sound source for every subband.

Figure 3:
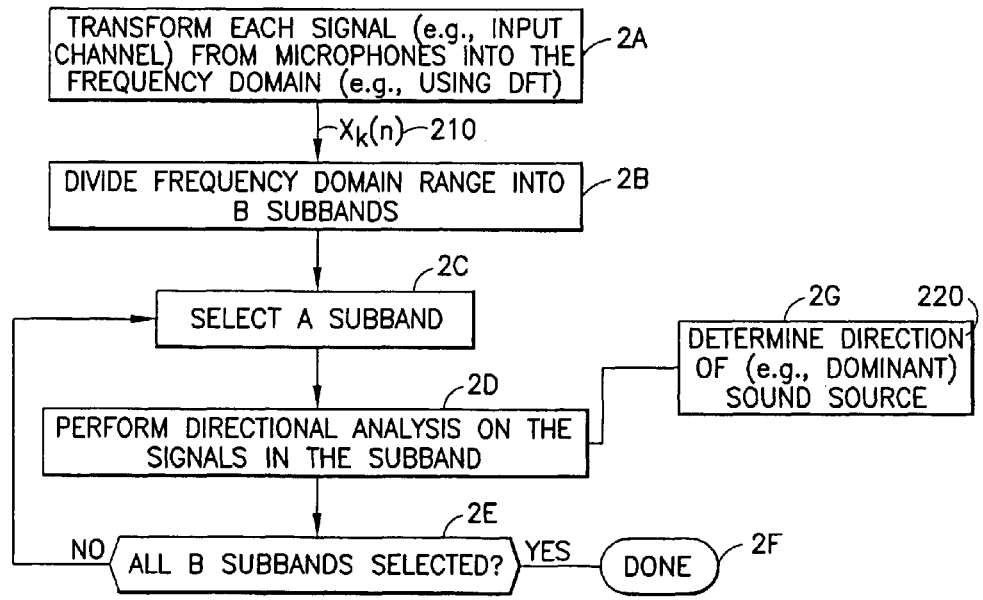
FIG. 3 is a block diagram of a flowchart for performing a directional analysis on microphone signals from multiple microphones.
Figure 4:
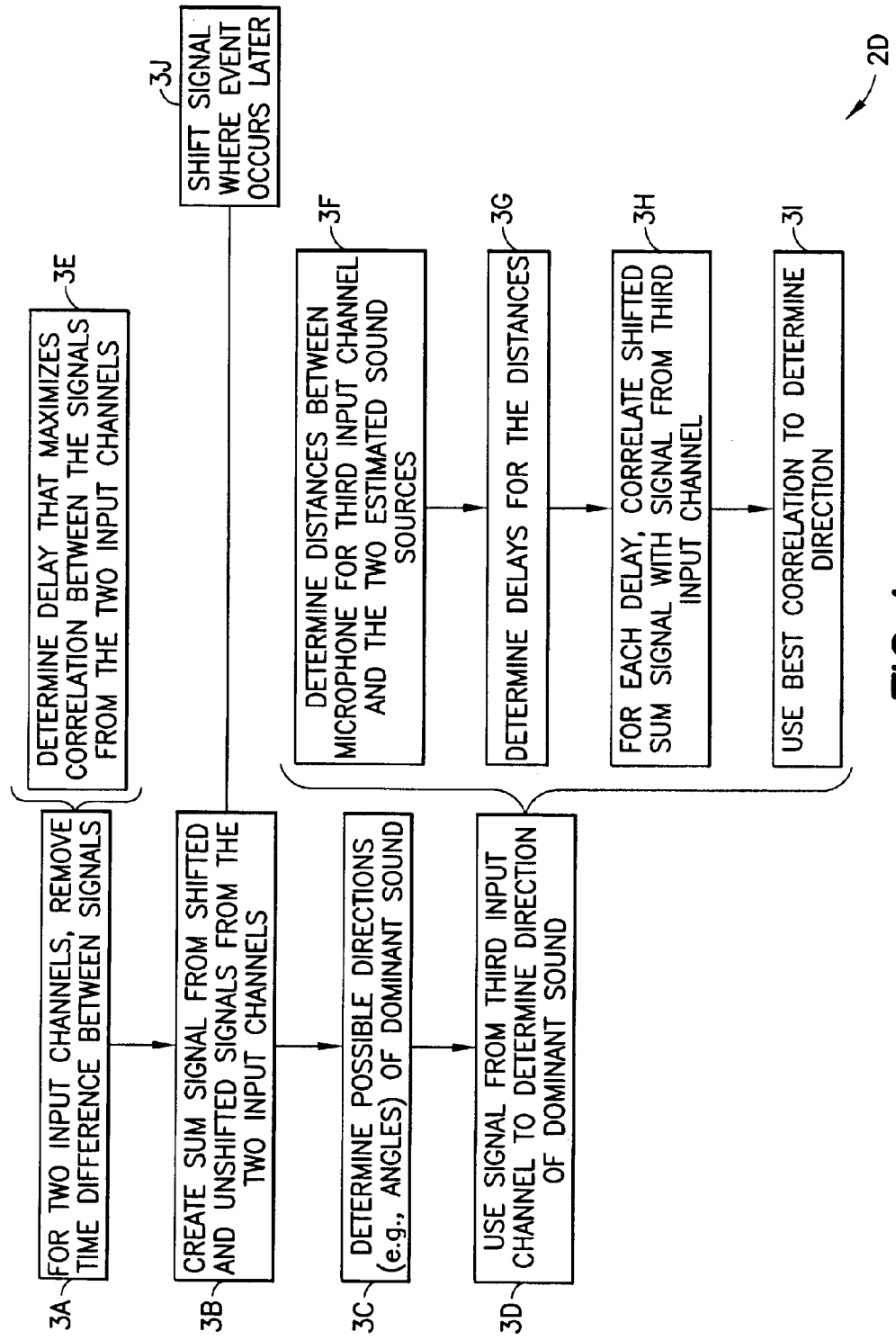
FIG. 4 is a block diagram of a flowchart for performing directional analysis on subbands for frequency-domain microphone signals.

Every input channel k=1, 2, 3 is transformed to the frequency domain using the DFT (discrete Fourier transform) (block 2A of FIG. 3). Each input channel corresponds to a signal 120-1, 120-2, 120-3 produced by a corresponding microphone 110-1, 110-2, 110-3 and is a digital version (e.g., sampled version) of the analog signal 120. In an exemplary embodiment, sinusoidal windows with 50 percent overlap and effective length of 20 ms (milliseconds) are used. Before the DFT transform is used, $D_{max}$ zeroes are added to the end of the window. $D_{max}$ corresponds to the maximum delay in samples between the microphones. In the microphone setup presented in FIG. 2, the maximum delay is obtained as $$D_{max} = \frac{dF_s}{v}, \quad (1)$$

where $F_s$ is the sampling rate of signal and v is the speed of the sound in the air. After the DFT transform, the frequency domain representation $X_k(n)$ (reference 210 in FIG. 3) results for all three channels, k=1, ... 3, $\underline{n}$=0, ..., N-1. N is the total length of the window considering the sinusoidal window (length $N_s$) and the additional $D_{max}$ zeroes.

The frequency domain representation is divided into B subbands (block 2B)

$$X_k^b(n) = X_k(n_b+n), \quad n=0, \quad . \quad . \quad . \quad , \quad n_{b+1}-n_b-1,$$
$$b=0, \ldots, B-1, \quad (2)$$

where $n_b$ is the first index of bth subband. The widths of the subbands can follow, for example, the ERB (equivalent rectangular bandwidth) scale.

For every subband, the directional analysis is performed as follows. In block 2C, a subband is selected. In block 2D, directional analysis is performed on the signals in the subband. Such a directional analysis determines a direction 220 ($\alpha_b$ below) of the (e.g., dominant) sound source (block 2G). Block 2D is described in more detail in FIG. 4. In block 2E, it is determined if all subbands have been selected. If not (block 2B=NO), the flowchart continues in block 2C. If so (block 2E=YES), the flowchart ends in block 2F.

More specifically, the directional analysis is performed as follows. First the direction is estimated with two input channels (in the example implementation, input channels 2 and 3). For the two input channels, the time difference between the frequency-domain signals in those channels is removed (block 3A of FIG. 4). The task is to find delay $\tau_b$ that maximizes the correlation between two channels for subband b (block 3E). The frequency domain representation of, e.g., $X_k^b(n)$ can be shifted $\tau_b$ time domain samples using $$X_{k,\tau_b}^b(n) = X_k^b(n) e^{-j\frac{2\pi n \tau_b}{N}}. \quad (3)$$

Now the optimal delay is obtained (block 3E) from $$\max_{\tau_b} Re(\Sigma_{n=0}^{n_{b+1}-n_b-1}(X_{2,\tau_b}^b(n)^* X_3^b(n))), \tau_b \in [-D_{max}, D_{max}] \quad (4)$$

where Re indicates the real part of the result and * denotes complex conjugate. $X_{2,\tau_b}^b$ and $X_3^b$ are considered vectors with length of $n_{b+1}-n_b-1$ samples. Resolution of one sample is generally suitable for the search of the delay. Also other perceptually motivated similarity measures than correlation can be used. With the delay information, a sum signal is created (block 3B). It is constructed using following logic $$X_{sum}^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}, \quad (5)$$

where $\tau_b$ is the $\tau_b$ determined in Equation (4).

In the sum signal the content (i.e., frequency-domain signal) of the channel in which an event occurs first is added as such, whereas the content (i.e., frequency-domain signal) of the channel in which the event occurs later is shifted to obtain the best match (block 3J).

Turning briefly to FIG. 2, a simple illustration helps to describe in broad, non-limiting terms, the shift $\tau_b$ and its operation above in equation (5). A sound source (S.S.) 131 creates an acoustic signal 191 that creates an event described by the exemplary time-domain function $f_1(t)$ 130 received at microphone 2, 110-2. That is, the signal 120-2 would have some resemblance to the time-domain function $f_1(t)$ 130. Similarly, the same event, when received by microphone 3, 110-3 is described by the exemplary time-domain function $f_2(t)$ 140. It can be seen that the microphone 3, 110-3 receives a shifted version of $f_1(t)$ 130. In other words, in an ideal scenario, the function $f_2(t)$ 140 is simply a shifted version of the function $f_1(t)$ 130, where $f_2(t)=f_1(t-\tau_b)$. Thus, in one aspect, this exemplary embodiment for determining directions of sound sources removes a time difference between when an occurrence of an event occurs at one microphone (e.g., microphone 3, 110-3) relative to when an occurrence of the event occurs at another microphone (e.g., microphone 2, 110-2). This situation is described as ideal because in reality the two microphones will likely experience different environments, their recording of the event could be influenced by constructive or destructive interference or elements that block or enhance sound from the event, etc. The acoustic signal 191 would be received at all three microphones 110, and if there are multiple sound sources 131, the acoustic signal 191 would be representative of the multiple sound sources 131.

The shift $\tau_b$ indicates how much closer the sound source is to microphone 2, 110-2 than microphone 3, 110-3 (when $\tau_b$ is positive, the sound source is closer to microphone 2 than microphone 3). The actual difference in distance can be calculated as $$\Delta_{23} = \frac{v\tau_b}{F_s}. \quad (6)$$

Utilizing basic geometry on the setup in FIG. 2, it can be determined that the angle of the arriving sound is equal to (returning to FIG. 4, this corresponds to block 3C)

$$\dot{\alpha}_b = \pm \cos^{-1}\left(\frac{\Delta_{23}^2 + 2b\Delta_{23} - d^2}{2db}\right), \quad (7)$$

where d is the distance between microphones and b is the estimated distance between sound sources and nearest microphone. Typically b can be set to a fixed value. For example b=2 meters has been found to provide stable results. Notice that there are two alternatives for the direction of the arriving sound as the exact direction cannot be determined with only two microphones.

The third microphone is utilized to define which of the signs in equation (7) is correct (block 3D). An example of a technique for performing block 3D is as described in reference to blocks 3F to 3I. The distances between microphone 1 and the two estimated sound sources are the following (block 3F):

$$\delta_b^+ = \sqrt{(h+b\sin(\dot{\alpha}_b))^2 + (d/2+b\cos(\dot{\alpha}_b))^2}$$

$$\delta_b^- = \sqrt{(h-b\sin(\dot{\alpha}_b))^2 + (d/2+b\cos(\dot{\alpha}_b))^2}, \quad (8)$$

where h is the height of the equilateral triangle, i.e.

$$h = \frac{\sqrt{3}}{2}d. \quad (9)$$

The distances in equation (8) equal to delays (in samples) (block 3G)

$$\tau_b^+ = \frac{\delta^+ - b}{v}F_s$$

$$\tau_b^- = \frac{\delta^- - b}{v}F_s. \quad (10)$$

Out of these two delays, the one is selected that provides better correlation with the sum signal. The correlations are obtained as (block 3H)

$$c_b^+ = Re(\Sigma_{n=0}^{nb+1-nb-1}(X_{sum,\tau_b^+}^b(n)^*X_1^b(n)))$$

$$c_b^- = Re(\Sigma_{n=0}^{nb+1-nb-1}(X_{sum,\tau_b^-}^b(n)^*X_1^b(n))). \quad (11)$$

Now the direction is obtained of the dominant sound source for subband b (block 3I):

$$\alpha_b = \begin{cases} \dot{\alpha}_b & c_b^+ \geq c_b^- \\ -\dot{\alpha}_b & c_b^+ < c_b^- \end{cases}. \quad (12)$$

The same estimation is repeated for every subband (e.g., as described above in reference to FIG. 3).

After the directional analysis, we now have estimates for the dominant sound source for every subband b. Directional information still needs some additional processing, i.e., one individual subband in one frame pointing to some particular direction should not cause any visible output to the display, but when there is a group of subbands pointing to approximately to the same direction then that particular direction "activates" in the display.

In the spatial analysis, the information of the sound source directions is updated at frequent intervals, for example every 20 ms (milliseconds) for multiple frames of microphone signal information. For every update instant and for every frequency domain subband b, the parameter $\alpha_b$ (in certain embodiments) describes the direction of the main sound source for that particular subband. Before further processing, statistical analysis is performed. Thus, returning to FIG. 1, in block 1B, the computer system performs statistical analysis of the direction information to determine (e.g., prominent) sound sources (e.g., for the multiple frames of signal information) and the direction of those sound sources relative to the computer system. That is, there may be multiple possible sound sources in a sound field, but in an exemplary embodiment only some of those will be deemed to be prominent sound sources.

First of all, it is reasonable to perform the statistical analysis for example five times in a second, thus several frames of data can be analyzed together. For instance, 10 frames may be used, each of which is 20 ms long. In addition, it is reasonable to remove from the data set the directions in which there are only rare occurrences. Sources from the approximately same direction are grouped into one group. A criterion of a certain threshold should be exceeded before a sound source is estimated to exist (block 1C of FIG. 1). As a result of the analysis, the directions of the prominent sound sources around the device are detected.

In block 1D, the computer system characterizes selected sound sources. For instance, the strengths of the sources can be roughly estimated by the number of occurrences in that particular, approximate direction or by a more complex analysis such as calculating signal energy for subbands pointing in that approximate direction (block 1E).

Another possible characterization is determining frequency content for the sound source (block 1F). It can be analyzed if subbands pointing to a particular direction are more low or high frequency subbands, or if the whole frequency range is represented. A further possible characterization includes estimating whether a sound source is continuous (e.g., whistling) or not continuous (e.g., a clap). In block 1G, the computer system estimate if the sound is continuous based on previous calculations. That is, if there was a sound source in the previous set of frames having a similar direction (based on a predetermined criterion) as compared to a sound source in the current set of frames, the sound from that sound source is estimated to be continuous.

It is noted that block 1D can limit the number of sound sources that are selected based on one or more criteria. For instance, only those sounds sources might be selected that are greater than (or less than) an estimated strength, are above (or below) a frequency (e.g., or are within a frequency range), or whether a sound source is continuous (or is discontinuous). Processing power is another possible criterion. For example, if 10 sound sources are found in block 1B, it may take too much estimated processing power (above a threshold) to generate visual effect information for all of these, and only a number of sound sources are selected so that the estimated processing power is below the threshold. In another example, the estimated power usage, e.g., in order to generate visual effect information (or to perform part of a block 1E, 1F, 1G or one or more of the blocks 1E, 1F, 1G) may be greater than a threshold, and therefore only certain sound sources are selected for blocks 1E, 1F, 1G, and/or 1H in order to reduce the estimated power usage to below the threshold. As a further example, there may be a set number of sound sources that are to be displayed on the display. For instance, a user may set a maximum number of sound sources for display. Only that number or fewer sound sources will be displayed. These criteria may be combined. Illustratively, if five sound sources are determined to exist in block 1B, but block 1D selects only four because four is the maximum number of sound sources to be displayed, the four sound sources having the highest strength could be displayed.

In block 1H, the computer system generates visual effect information (e.g., based on the previously determined characterization) for each of the sound sources, such that the information indicates at least in part direction of a sound source. Examples of block 1H include blocks 1I, 1J, and 1K. In block 1I, the computer system generates information corresponding to the strength of each sound source. For instance, different thickness of lines for different strengths may be used. Similarly, different colors for different strengths may be used. In block 1J, the computer system generates information corresponding to frequency content. Illustratively, the information can include spacing of lines proportional to frequency content or using different colors schemes based on frequency content. In block 1K, the computer system generates information corresponding to continuous/discontinuous sound, such as "solid" effects for continuous sound, discrete lines for discontinuous sound. Another example of block 1H is to synthesize a new wave from the direction of the sound source. Strength (block 1I) and continuity (block 1K) of the signal define the color and shape of the wave. After this, in an exemplary embodiment, the synthesized wave evolves by itself through the screen, i.e., later directional information does not have any effect on the synthesized wave.

In block 1L, the computer system outputs display information (e.g., comprising visual effect information), which is suitable to be viewed on a display. In block 1M, the computer system can display the visual effect information on the display. In the examples shown below, the computer system is a mobile device having an integral display. However, the mobile device is merely one example and a computer system is not limited thereto. In block 1N, in a screensaver embodiment, blocks 1A through 1M are performed while the screensaver is enabled (e.g., operational). In another example, blocks 1A to 1M are performed while the user has a program enabled to create the visual effects.

Figure 5:
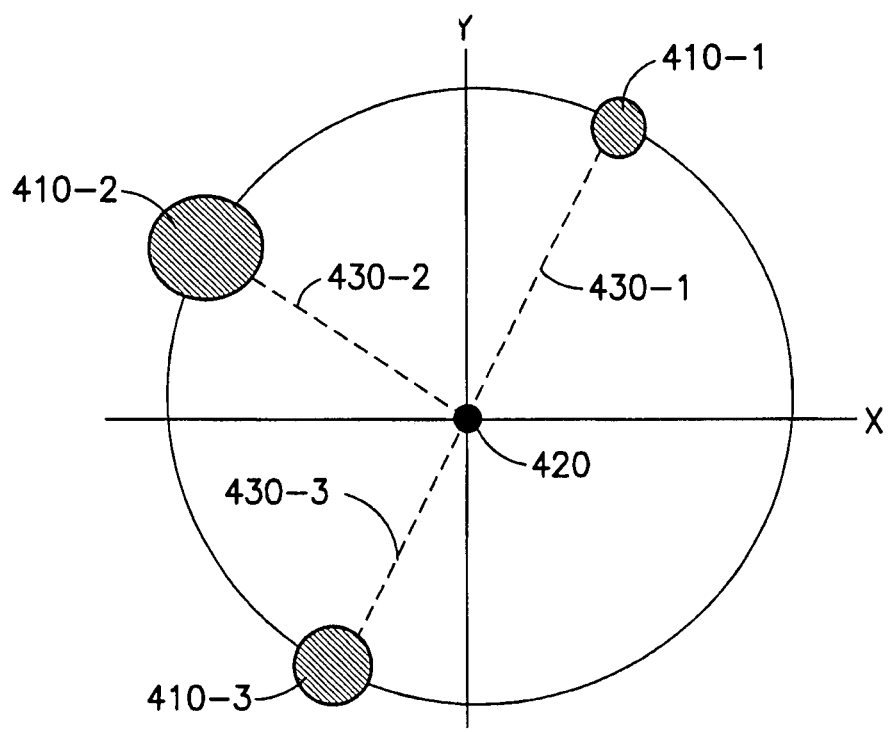
FIG. 5 illustrates a typical analysis result, and shows three sound sources around a mobile device positioned in a middle of a circle; a size of the sound source circle indicates a strength of a signal for that sound source.

An illustration of a typical analysis result is shown in FIG. 5, in which three sound sources are detected around the device. This figure shows three sound sources 410-1, 410-2, and 410-3 around a mobile device (see, e.g., 530 in FIG. 6) assumed to be in position 420 in the middle the coordinate system and in the middle of a circle upon which the sound sources are mapped. A size of a circle corresponding to a sound source 410 indicates a strength of a signal for that sound source. The sound source 410-1 is at a direction 430-1 relative to the position 420 of the mobile device; sound source 410-2 is at a direction 430-2 relative to the position 420 of the mobile device; sound source 410-3 is at a direction 430-3 relative to the position 420 of the mobile device.

The directions of the sound sources can be utilized, e.g., in an entertaining screen saver or simply as visualization of sound, as illustrated in FIG. 6 (including FIGS. 6A and 6B), in which waves (a visual effect 510) arriving from different directions are used. The waves are shown on the display 520 of a mobile device 530. Equally for example the color of the background can be changed based on the strength of the sound in that particular direction. FIG. 6A shows the visual effects 510-1, 510-2, and 510-3 produced corresponding to the sound sources 410-1, 410-2, and 410-2. In FIG. 6A, the strength of each sound source 410 is illustrated by the visual representations of different thicknesses of lines in corresponding visual effects 510. For instance, the strength of the sound source 410-2 is the largest, so the lines are the thickest; the strength of the sound source 410-2 is the between the largest and the smallest, so the lines are of a medium thickness; the strength of the sound source 410-1 is the smallest, so the lines are the thinnest. These sounds are also judged to be discontinuous (e.g., claps), so the visual representation of the lines are interspersed with "blank" areas (e.g., having an underlying graphic).

In FIG. 6B, the coordinate system is shown for reference. In this example, the sound sources 410 are mapped to corresponding starting points 560 along the edge 540 of the display 520. The starting points 560 are locations from which the visual effects 510 appear to emanate, and the lines in the visual effects 510 are akin to waves caused by a stone that drops into water. The visual effects 510 provide indications of corresponding directions 430 of the sound sources 410. For example, the visual effects 510 could travel along the directions 430 or the emanation at starting points 560 could indicate the directions 430. Also, the starting points 560 are merely exemplary, and the starting points could be located outside the physical dimensions of the mobile device 530 (e.g., thereby indicating how close or far the sound is) or start within the dimensions of the display 520.

FIGS. 7 and 8 illustrate a wireless device and exemplary locations for microphones in the wireless device. In FIG. 7, microphone 610-1 is placed on the right edge 640 of the case 650; microphone 610-2 is placed on the top edge 630 of the case 650; microphone 610-3 is placed on the left edge 620 of the case 650. The arrangement of microphones 610 in FIG. 7 is useful if the backside 660 of the mobile device 530 is sitting on a surface 710.

This example also shows a visual effect 510-4 traveling along the direction 430-4. In this example, a continuous sound is determined (block 1G from FIG. 1) and the visual effect 510-4 is "shaded" (block 1K from FIG. 1) when generated. That is, between the visual representation of lines 670-1 and 670-2, a visual representation of shading 680-1 is used and between the line 670-2 and the edge 540 of the case 650, a visual representation of shading 680-2 is used. The shadings 680-1 and 680-2 correspond to frequency content determined in block 1F of FIG. 1 and "inserted" into the visual effect 510-4 via block 1J of FIG. 1 and the shadings 680 are such that higher frequency corresponds to darker shadings in this exemplary embodiment (where the shading 680-1 is darker than the shading 680-2). A similar example may be used with color. That is, frequency domain information is utilized, i.e., in an example where the color (shown as shading in FIG. 7) of the waves could be defined by the frequency content of the corresponding sound source. For instance, the sound source with high frequency content and the waves along corresponding directions can be illustrated with brighter colors than sound sources with only low frequency content.

The visual representations for visual effects shown in the figures are merely exemplary, and different visual representations for the visual effects may be used. For instance, arrows that "shoot" across the display in path indicative of the direction of a sound source may be used as a visual representation. Many other options are also possible.

The example of FIG. 8 shows an exemplary suitable arrangement of microphones should the mobile device 530 be held by the user. In this example, the microphone 610-4 is open to the front surface 690 of the case 650. A similar microphone may be placed on the backside 660 of the mobile device 530. It is noted the microphones 610-1, 610-3, and 610-4 form an acute triangle A and are positioned at vertices of the triangle.

FIG. 8 also shows another exemplary suitable arrangement of microphones, where the case 650 has four corners 691-1, 691-2, 691-3, and 691-4. Microphones 610-5, 610-6, and 610-7 are placed proximate (within a predetermined small distance from or at) respective corners 691-1, 691-3, and 691-4. The microphones 610-5, 610-6, and 610-7 form an acute triangle B and are positioned at vertices of the triangle B.

Although three or more microphones are useful to make directional analysis easier, directional analysis may also be performed with two microphones. Assuming for example that there is one microphone at the top 630 and one microphone at the bottom 695 of the mobile device 530, the visual effects 510 may be shown with waves coming from these two directions only. In this case, only equations 1-7 are needed from the above directional analysis example that uses subbands.

Figure 9:
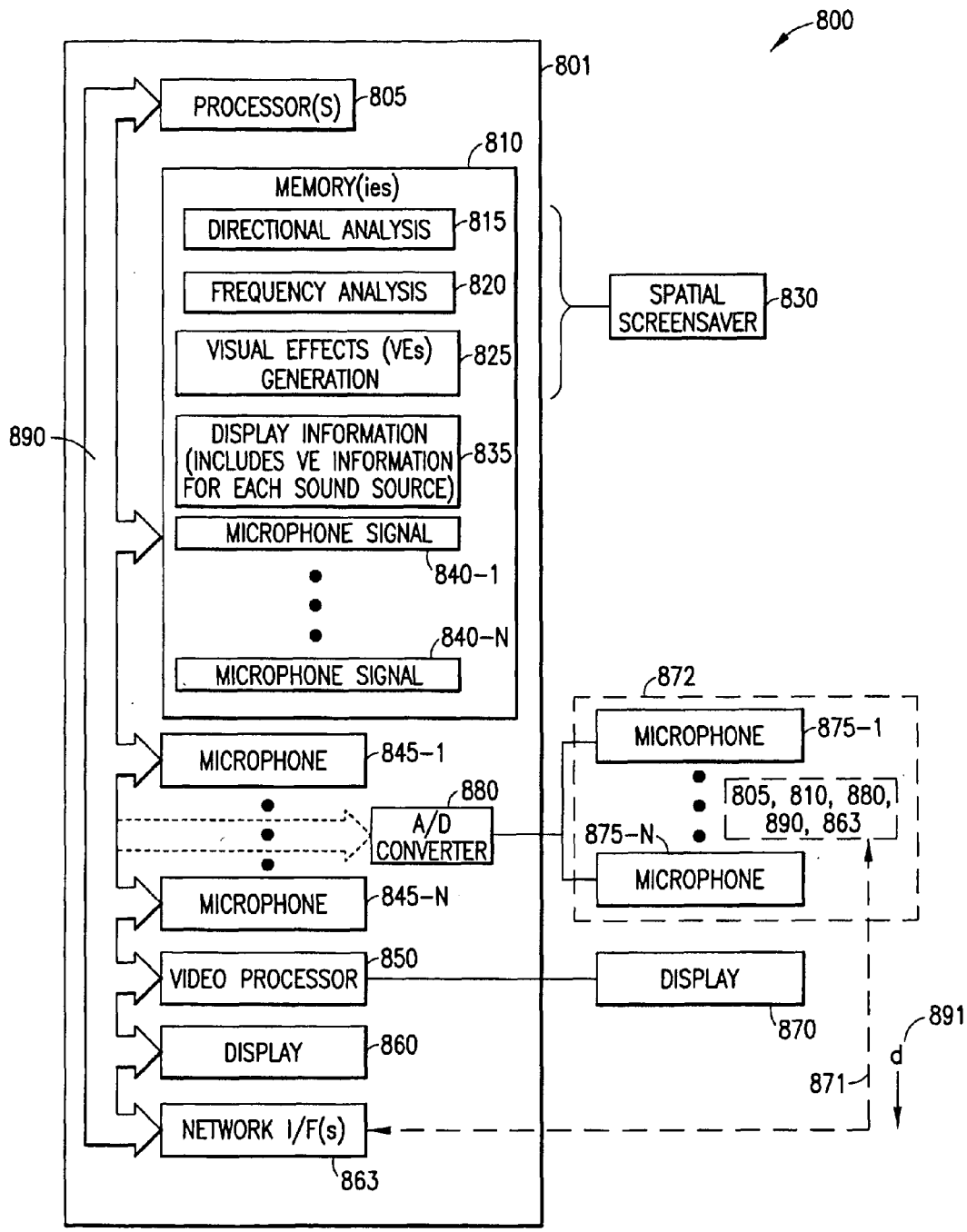
FIG. 9 shows a block diagram of an exemplary system including a mobile device suitable for practicing the exemplary embodiments of the instant invention.

Turning to FIG. 9, this figure shows a block diagram of an exemplary system 800 including a mobile device 801 suitable for practicing the exemplary embodiments of the instant invention. The mobile device 801 is an example of a computer system. System 800 as shown has multiple configurations, some of which typically might not be used at the same time but are included to illustrate multiple examples. System 800 includes a mobile device 801 comprising one or more processors 805, one or more memories 810, N microphones 845-1 through 845-N (where N is two or greater), an analog-to-digital (A/D) converter 880, a video processor 850, a display 860, and one or more network interfaces (I/F(s)) 863. The one or more memories 810 include a directional analysis module 815, a frequency analysis module 820, a visual effects (VEs) generation module 825, a display information module 835, and N microphone signals 840-1 through 840-N (e.g., a digital representation of the microphone signals 120 of FIG. 2). The system 800 may also include N microphones 875 and display 870, each of which is external to the mobile device 801. The one or more network interfaces 863 are wired, wireless, or both network interfaces.

In one exemplary embodiment, the directional analysis module 815 accesses the microphone signals 840 and performs one or more of the techniques presented above to determine directions, relative to a location of the mobile device 801, of sound sources 410. The frequency analysis module 820 analyses the microphone signals 840 and produces frequency information for each of the sound sources 825, if visual effects 510 are to include indication(s) of frequency information. The visual effects generation module 825 generates visual effects 510 using the techniques presented above. The visual effects generation module may also perform additional analysis on the microphone signals 840, such as the strength analysis and continuous/discontinuous analysis described above. The frequency analysis performed by frequency analysis module 820 may also be performed by the visual effects generation module 825. Further, the directional analysis module 815 may perform the directional analysis as described above on subbands, and the visual effects generation module may trigger the directional analysis module 815 on every frame of signal information in microphone signals 840, and then analyze the subband directional results using statistical techniques as described above to determine directions 430 of the sound sources 410. Thus, the modules 815, 820, and 825 may be combined or further subdivided and are presented herein for ease of exposition. In an exemplary embodiment, for instance, the modules 815, 820, and 825 make up portions of a spatial screensaver 830, which is used to display visual effects 510 on a display 860 (or 870 or both) as a screensaver. That is, during an idle period when the mobile device 801 is not being used by a user but is in an active state, the spatial screensaver 830 then outputs display information 835 to a display 860 (or 870) for entertainment and/or for security (e.g., upon exit of screensaver mode, a user has to enter a password and cannot view information other than display information 835 without a correct password).

The visual effects generation module 825 creates display information 835, which is suitable to be viewed on a display 860, 870. For instance, the display information 835 could be a frame of video to be written (e.g., by video processor 850) to the display 860, and the visual effects generation module 825 will create the visual effect information corresponding to the visual effects 510 such as by writing data corresponding to waves into the frame. The visual effects generation module 825 then creates multiple frames of video so that the "waves" (or other visual effects 510) appear to move across the display 860. It is also noted that the video processor 850 may have its own memory 810, and the display information 835 may reside completely within the memory 810 of the video processor 850.

The microphones 875 are external to the mobile device 801 and may be used as previously described and in lieu of the internal microphones 845. There may also be some combinations of microphones 845, 875 used to create a suitable number of microphones. For instance, the mobile device may only have one internal microphone 845, but may use two external microphones 875. The A/D converter 880 may be used with either of the internal microphones 845 or the external microphones 875 to convert analog microphone signals into digital microphone signals.

The display 870 is in addition to or lieu of display 860. For instance, one could use a mobile device 801 providing an external HDMI (high definition multimedia interface) connection (via video processor 850) to a display 870, and the visual effects 510 could be presented on one or both displays 860/870.

Another possibility is also illustrated in FIG. 9. In this example, the microphones 875 may be part of another device 872, such as another computer system or mobile device. The device 872 may comprise one or more processors 805, one or more memories 810 and one or more A/D converters 880, one or more buses 890, and one or more network interfaces 863. The device 872 may perform certain processing and send certain information based on the processing to the mobile device 801. For instance, the device 872 could create digital microphone signals 840 and send the signals 840 to the mobile device 801 via one or more network links 871. The device 872 could further perform directional analysis, using directional analysis module 815 in memories 810, on the microphone signals 840 to determine directions (d, 891) of sound sources, and send the directions to the mobile device 801 via the one or more network links 871. It is noted that the determined directions would be relative to a location of the device 872.

Without in any way limiting the scope, interpretation, or application of the claims appearing below, a technical effect of one or more of the example embodiments disclosed herein is to provide directional information using visual effects, e.g., on screensaver. Another technical effect is to provide frequency information using visual effects, e.g., on screensaver.

Embodiments of the present invention may be implemented in software, hardware, application logic or a combination of software, hardware and application logic. In an exemplary embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of computers described and depicted. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    two or more omnidirectional microphones;
    a display;
    one or more processors; and
    one or more memories including computer program code,
    the one or more memories and the computer program code configured to, with the one or more processors, cause the apparatus to perform at least the following:
    determining, using signals captured from the two or more omnidirectional microphones configured to detect an acoustic signal from one or more sound sources, an estimate of a set of one or more dominant sound sources based on directional analysis of subbands of the one or more sound sources;
    determining one or more prominent sound sources based on statistical analysis of estimates of the dominant sound sources, wherein the prominent sound sources are prominent members of the set of dominant sound sources;
    determining frequency information for each of the one or more sound sources dependent on one or more of the subbands of the one or more sound sources;
    determining one or more directions relative to a position of at least one of the two or more omnidirectional microphones for at least one of the one or more prominent sound sources; and
    outputting output information suitable to be viewed on the display, the information providing for the at least one prominent sound source a visual effect indicating at least in part the one or more directions, relative to the position of at least one of the two or more omnidirectional microphones, of the at least one prominent sound source in the acoustic signal, wherein the visual effect is dependent on the at least one prominent sound source and on the frequency information associated with at least the at least one or more prominent sound sources and comprises one or more visual representations moving across the display indicating at least in part the one or more directions.

2. The apparatus of claim 1, wherein the information further provides for each of the at least one prominent sound sources a visual effect indicating at least in part the one or more directions, relative to the position of at least one microphone, of the prominent sound source in the acoustic signal.

3. The apparatus of claim 1, further comprising the plurality of microphones, where the one or more directions are relative to a position of the apparatus.

4. The apparatus of claim 3, further comprising the display, wherein the display has a position relative to the position of the apparatus, and wherein the visual effect indicates real directions, relative to the position of the display, of the one or more prominent sound sources.

5. The apparatus of claim 1, further comprising the display, and wherein the one or more memories and the computer program code are further configured to, with the one or more processors, cause the apparatus to perform at least the following:

displaying on the display the visual effect of the at least one prominent sound source.

6. The apparatus of claim 5, wherein the displaying is performed as part of a screensaver and is performed while the screensaver is enabled.

7. The apparatus of claim 1, wherein outputting information further comprises outputting the information where the visual effect for one of the prominent sound sources indicates a strength of the selected sound source.

8. The apparatus of claim 1, wherein outputting information further comprises outputting the information where the visual effect for one of the prominent sound sources indicates a frequency content of the selected sound source.

9. The apparatus of claim 1, wherein outputting information further comprises outputting the information where the visual effect for one of the prominent sound sources indicates whether the selected sound source is determined to be one of continuous or discontinuous, wherein a visual effect indicating a continuous sound source is different from a visual effect indicating a discontinuous sound source.

10. The apparatus of claim 1, wherein determining one or more prominent sound sources further comprises determining the one or more prominent sound sources based on strength of the one or more sound sources.

11. The apparatus of claim 1, wherein determining one or more prominent sound sources further comprises determining the one or more sound prominent sources based on frequency content of the one or more sound sources.

12. The apparatus of claim 1, wherein determining one or more prominent sound sources further comprises determining the one or more sound prominent sources based on processing power estimated to be used to generate the output information for the one or more sound sources.

13. The apparatus of claim 1, wherein determining one or more prominent sound sources further comprises determining the one or more sound prominent sources based on power estimated to be used by the apparatus to generate the output information for the one or more sound sources.

14. The apparatus of claim 1, wherein determining one or more prominent sound sources further comprises determining the one or more sound prominent sources based on a set number of sound sources for which visual effects are to be output.

15. The apparatus of claim 1, wherein the two or more microphones comprise three microphones, and wherein the three microphones are positioned as part of an acute triangle with one of the microphones at each of the vertices of the triangle.

16. The apparatus of claim 15, wherein the apparatus has a case and each of the three microphones is positioned proximate a corner of the case.

17. A method, comprising:
    determining, using signals captured from two or more omnidirectional microphones configured to detect an acoustic signal from one or more sound sources,
    an estimate of a set of one or more dominant sound sources based on directional analysis of subbands the one or more sound sources;
    determining one or more prominent sound sources based on statistical analysis of estimates of the dominant sound sources, wherein the prominent sound sources are prominent members of the set of dominant sound sources;
    determining frequency information for each of the one or more sound sources dependent on one or more of the subbands of the one or more sound sources;
    determining one or more directions relative to a position of at least one of the two or more omnidirectional microphones for at least one of the one or more prominent sound sources; and
    outputting output information suitable to be viewed on a display, the information providing for the at least one prominent sound source a visual effect indicating at least in part the one or more directions, relative to the position of at least one of the two or more omnidirectional microphones, of the at least one prominent sound source in the acoustic signal, wherein the visual effect is dependent on the at least one prominent sound source and on the frequency information associated with at least the at least one or more prominent sound sources and comprises one or more visual representations moving across the display indicating at least in part the one or more directions.

18. A computer program product comprising a non-transitory computer-readable medium bearing computer program code embodied therein for use with a computer, the computer program code comprising:
    code for determining, using signals captured from two or more omnidirectional microphones configured to detect an acoustic signal from one or more sound sources, an estimate of a set of one or more dominant sound sources based on directional analysis of subbands of the one or more sound sources;
    code for determining one or more prominent sound sources based on statistical analysis of estimates of the dominant sound sources, wherein the prominent sound sources are prominent members of the set of dominant sound sources;
    code for determining frequency information for each of the one or more sound sources dependent on one or more of the subbands of the one or more sound sources;
    code for determining one or more directions relative to a position of at least one of the two or more omnidirectional microphones for at least one of the one or more prominent sound sources; and
    code for outputting output information suitable to be viewed on a display, the information providing for the at least one prominent sound source a visual effect indicating at least in part the one or more directions, relative to the position of at least one of the two or more omnidirectional microphones, of the at least one prominent sound source in the acoustic signal, wherein the visual effect is dependent on the at least one prominent sound source and on the frequency information associated with at least the at least one or more prominent sound sources and comprises one or more visual representations moving across the display indicating at least in part the one or more directions.

* * * * *